United States Patent
Strauss et al.

(10) Patent No.: US 9,759,164 B2
(45) Date of Patent: Sep. 12, 2017

(54) FLUID ENERGY MACHINE, IN PARTICULAR FOR AN EXHAUST GAS TURBOCHARGER OF AN AUTOMOBILE

(71) Applicant: IHI CHARGING SYSTEMS INTERNATIONAL GMBH, Heidelberg (DE)

(72) Inventors: Tino Strauss, Mannheim (DE); Jan Ehrhard, Wiesloch (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 737 days.

(21) Appl. No.: 14/279,061

(22) Filed: May 15, 2014

(65) Prior Publication Data
US 2014/0248134 A1    Sep. 4, 2014

Related U.S. Application Data

(63) Continuation-in-part of application No. PCT/EP2012/004237, filed on Oct. 10, 2012.

(30) Foreign Application Priority Data

Dec. 1, 2011 (DE) .................. 10 2011 119 879

(51) Int. Cl.
*F04D 29/44* (2006.01)
*F02M 25/07* (2006.01)
(Continued)

(52) U.S. Cl.
CPC ............. *F02M 25/07* (2013.01); *F01D 17/16* (2013.01); *F02C 6/12* (2013.01); *F02M 26/00* (2016.02);
(Continued)

(58) Field of Classification Search
CPC ..... F01D 5/14; F01D 1/02; F01D 1/06; F04D 29/30; F02M 25/07
See application file for complete search history.

(56) References Cited

U.S. PATENT DOCUMENTS 1,948,478 A    2/1934 Biggs
2,805,818 A *  9/1957 Ferri ....................... F04D 21/00
                                                     415/148
(Continued)

FOREIGN PATENT DOCUMENTS

EP    1 394 359        3/2004
GB    2 036 885        7/1980
JP    2000120442 A  *  4/2000 .............. F02B 37/24

*Primary Examiner* — Mark Laurenzi
*Assistant Examiner* — Shafiq Mian
(74) *Attorney, Agent, or Firm* — Klaus J. Bach

(57) ABSTRACT

In a fluid energy machine, such as an exhaust gas turbocharger of an internal combustion engine of an automobile, with a casing accommodating a rotor wheel that is rotatable about a first axis of rotation extending in the axial direction of the casing, an inlet flow passage which extends generally in a flow direction at an angle relative to the axial and the radial directions to the housing, the flow passage is formed by spaced insertion elements with spherical sections that have a common center of curvature disposed on the first axis of rotation and guide vanes are supported between the spaced spherical wall sections of the insertion elements so as to be rotatable about a second axis of rotation which extends through the common center of curvature, and have opposite axial end walls also curved spherically with a center of curvature coinciding with the center of curvature of the insertion elements thereby to be pivotable between the two spaced spherical wall sections of the insertion elements with minimal clearance.

5 Claims, 2 Drawing Sheets

(51) Int. Cl.
  *F01D 17/16* (2006.01)
  *F04D 29/46* (2006.01)
  *F04D 29/42* (2006.01)
  *F02C 6/12* (2006.01)
  *F02M 26/00* (2016.01)

(52) U.S. Cl.
  CPC ....... *F04D 29/4213* (2013.01); *F04D 29/462* (2013.01); *F05D 2220/40* (2013.01); *F05D 2250/51* (2013.01)

(56) References Cited

U.S. PATENT DOCUMENTS

| | | | |
|---|---|---|---|
| 3,074,689 A | 1/1963 | Chapman | |
| 3,151,841 A | 10/1964 | Henny | |
| 3,802,046 A * | 4/1974 | Wachtell | B23H 9/10 219/69.17 |
| 3,957,392 A * | 5/1976 | Blackburn | F04D 27/02 415/146 |
| 3,997,281 A * | 12/1976 | Atkinson | F04D 29/444 415/207 |
| 4,428,714 A * | 1/1984 | Mowill | F04D 27/0253 415/161 |
| 4,657,481 A * | 4/1987 | Mowill | F04D 29/462 415/151 |
| 4,844,695 A * | 7/1989 | Banks | F04D 29/462 415/119 |
| 4,932,206 A | 6/1990 | Sawyer | |
| 4,948,333 A * | 8/1990 | Meer | F01D 9/048 415/101 |
| 5,228,832 A * | 7/1993 | Nishida | F04D 17/06 415/208.1 |
| 5,354,173 A * | 10/1994 | Reynolds | F02C 3/085 415/204 |
| 6,824,355 B2 * | 11/2004 | Behrendt | F01D 17/162 415/160 |
| 2011/0097203 A1 * | 4/2011 | Shibata | F04D 17/12 415/207 |
| 2015/0016968 A1 * | 1/2015 | Grabowska | F02B 37/24 415/148 |
| 2016/0040590 A1 * | 2/2016 | Sommerhoff | F01D 17/16 60/612 |

* cited by examiner ial application PCT/EP2012/004237 filed Oct. 10, 2012 and claiming the priority of German patent application 10 2011 119 879.6 filed Dec. 1, 2011.

FLUID ENERGY MACHINE, IN PARTICULAR FOR AN EXHAUST GAS TURBOCHARGER OF AN AUTOMOBILE

This is a Continuation-In-Part application of pending international patent application PCT/EP2012/004237 filed Oct. 10, 2012 and claiming the priority of German patent application 10 2011 119 879.6 filed Dec. 1, 2011.

BACKGROUND OF THE INVENTION

The invention relates to a fluid energy machine, in particular for an exhaust gas turbocharger of a motor vehicle internal combustion engine.

EP 1 394 359 A1 discloses a turbine for an exhaust gas turbocharger, wherein the turbine is in the form of a so-called mixed flow turbine. The turbine comprises a turbine casing which includes a housing space in which a turbine wheel mounted on a shaft is rotatably supported. Furthermore, the turbine casing comprises at least one inlet flow passage through which the exhaust gas may flow. The exhaust gas is supplied to the inlet flow passage via a supply duct which is fluidly connected with the passage for directing the exhaust gas onto the turbine wheel in the housing space.

The turbine is referred to as a mixed flow turbine because the exhaust gas which is directed via the supply duct and the inlet flow passage into the housing space and onto the turbine wheel has a flow direction which extends at an angle relative to the axial as well as to the radial direction of the turbine. This means that the exhaust gas flows into the turbine wheel at an angle.

In the inlet passage, a guide element is positioned upstream of the turbine wheel, by means of which the flow of exhaust gas may be redirected. In the arrangement shown, the guide element is fixed relative to the turbine casing.

Furthermore, from series production of exhaust gas turbochargers it is known that variable turbine geometries for radial turbines of exhaust gas turbochargers are employed. Herein, the guide element arranged in the inlet passage may be pivoted about an axis of rotation which extends at least essentially in the axial direction relative to the turbine casing.

It was found that such variable turbine geometry cannot be applied easily to a mixed flow turbine, because jamming of the guide element may occur. The implementation of particularly large gap dimensions for preventing such jamming would result in an only low-efficiency operation of the turbine, because exhaust gas would bypass the guide element and thus flow to the turbine wheel in the housing space not properly oriented.

It is therefore the principal object of the present invention to provide a fluid energy machine with an inclined inlet passage including adjustable vane elements, which can be operated efficiently and reliably and which provides for a compact design.

SUMMARY OF THE INVENTION

In a fluid energy machine, such as an exhaust gas turbocharger of an internal combustion engine of an automobile, with a casing accommodating a rotor wheel that is rotatable about a first axis of rotation extending in the axial direction of the casing, an inlet flow passage which extends generally in a flow direction at an angle relative to the axial and the radial directions to the housing, the flow passage is formed by spaced insertion elements with spherical sections that have a common center of curvature disposed on the first axis of rotation and guide vanes are supported between the spaced spherical wall sections of the insertion elements so as to be rotatable about a second axis of rotation which extends through the common center of curvature, and have opposite axial end walls also curved spherically with a center of curvature coinciding with the center of curvature of the insertion elements thereby to be pivotable between the two spaced spherical wall sections of the insertion elements with minimal clearance.

Alternatively, it is possible to direct the gas via the flow passage which is fluidly connected with the supply duct in another flow direction which extends at an angle to the axial direction and to the radial direction from the housing space outwardly. In other words, the gas may flow either from a supply duct to the housing space in the flow direction or from the housing space to the supply duct in the other flow direction via the supply duct that is the fluid energy machine may be in the form of a compressor.

By means of this arrangement or orientation, respectively, of the second axis of rotation it is possible to provide the fluid energy machine with a variable flow geometry implemented by the guide vane elements and to adapt it to different operating points with different mass or volumes flows, respectively, of the gas. The inventive fluid energy machine may therefore be operated particularly efficiently. The fluid energy machine also exhibits a particularly high functional reliability, because any malfunction, e.g. in form of jamming of the guide element, is prevented or the risk of such a malfunction is very low.

By rotating the guide element about the second axis of rotation, an effective flow cross-section of the supply duct and thus of the fluid energy machine may be adjusted and adapted to different mass and volume flows, respectively, of the gas, so that the rotor wheel may be efficiently and effectively driven by the gas and/or an efficient and effective gas inflow of the rotor wheel is ensured.

Another advantage of the inventive fluid energy machine is an easy adaptation of the guide elements to a rotor wheel. The second axis of rotation is formed slanted relative to the first axis of rotation. In other words, a point of intersection between the first axis of rotation and the second axis of rotation is formed. By shifting this point of intersection along the first axis of rotation, the magnitude of an angle which is formed between the first axis of rotation and the second axis of rotation and which essentially corresponds to the inclination of the leading and trailing edge of the rotor wheel may be varied. If e.g. a turbine wheel as rotor wheel comprises a trailing edge which is formed at a respective angle relative to the axis of rotation of the turbine wheel, which corresponds to the first axis of rotation, the guide vanes may be adjusted according to the requirements of the fluid energy machine by shifting the point of intersection along the first axis of rotation. Thus, no further extensive design considerations are necessary which facilitates design changes.

The inventive fluid energy machine may e.g. be designed as a mixed flow turbine for the exhaust gas turbocharger. In a mixed flow turbine, exhaust gas such as the gas from a supply duct flows via the inlet flow passage to the housing space and drives the rotor wheel which is arranged in the housing space and forms a turbine wheel. Thereby, the exhaust gas is deflected by the vane elements, so that an aerodynamically efficient exhaust gas inflow to the turbine wheel is ensured and thus it may be driven efficiently.

The flow direction of the exhaust gas flowing to the turbine wheel is at an angle relative to the axial direction and at an angle relative to the radial direction, i.e. not exclusively axially or exclusively radially. Such a mixed inflow into the turbine wheel is particularly advantageous for passenger vehicle applications, because the mixed flow turbine has a particularly advantageous and stationary behavior and therefore provides for a very good operating performance of an associated combustion engine.

The inventive fluid energy machine may also be formed as a mixed flow compressor. Therein, air from the housing space flows via the adjustable vane structure to a supply duct for example to an intake system of the internal combustion engine.

Here, the air flows into the rotor wheel designed as a compressor wheel in the axial flow direction and leaves it at an angle relative to the axial direction and at least essentially at an angle relative to the radial direction and is deflected aerodynamically efficiently by the guide element. The compressor wheel serves to compress the air and to provide the combustion engine with compressed air.

In a particularly advantageous embodiment of the invention, a first wall area confines the supply duct at a first side and a second wall area of the fluid energy machine confines the supply duct at a second side opposite, and spaced from, the first side as well as a first guide element area which is arranged opposite the first wall area and a second guide element area which is arranged opposite the second wall area of the guide element, both with a sphere curvature having a center point disposed on the first axis of rotation with the second axis of rotation so that the walls are at least essentially sphere- or ball-shaped segments.

The ball-segmented configuration of the wall areas and the guide element areas is advantageous in that the guide vane element, which also has correspondingly curved side faces, can be rotated without jamming and thus is functionally reliable even at high temperatures for rotation about the second axis, while at the same time very small gap dimensions in particular between the guide element and the wall areas of the supply duct are implemented. Therefore, the inventive fluid energy machine exhibits a particularly high functional reliability and, at same time, is efficiently adaptable to different operating points as required.

In advantageous embodiment, the supply duct is at least partially confined by means of an insertion element which is formed separate from the casing and accommodated therein. This allows quick and cost efficient manufacture of the fluid energy machine, in particular its casing, e.g. by means of a casting method. Subsequently, the insertion element may be assembled quickly and cost-efficiently. Thereby, at least one of the wall areas which confine the supply duct may be formed by the insertion element.

In another advantageous embodiment of the invention, the guide vane element is rotatably supported about the second axis of rotation at the insertion element, so that a significantly improved function of the guide vane element may be achieved. By means of the rotatable guide vane elements, an inflow of the exhaust gas quantity flowing into the turbine wheel may be adjusted for different operating conditions so that a correspondingly preferred level of efficiency turbine may be obtained.

The guide vane element may be supported rotatably about the second axis of rotation at only one side. In a particularly advantageous embodiment of the invention, provisions are made that the guide element is rotatably supported about the second axis of rotation at a first guide vane element side and also at a guide vane element side facing away from the first guide vane element side. Thus, the guide vane element is supported at both sides and therefore well-defined so that the risk of malfunctions is low. This is beneficial in particular for the functional reliability of the inventive fluid energy machine.

The invention also comprises an exhaust gas turbocharger, in particular for an internal combustion engine of an automobile, with at least one fluid energy machine in accordance with the invention. Here, the fluid energy machine may be a turbine of the exhaust gas turbocharger, which may be driven by the exhaust gas of the internal combustion engine.

Alternatively or additionally it is possible, that the inventive fluid energy machine is a compressor of the exhaust gas turbocharger, by means of which air can be supplied to the internal combustion engine. Here, the exhaust gas turbocharger may be operated particularly efficiently which results in a low-fuel consumption operation of the combustion engine with only low $CO_2$ emission.

The invention will become more readily apparent from the following description of a preferred exemplary embodiment thereof with reference to the accompanying drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention.

DESCRIPTION OF A PARTICULAR EMBODIMENT OF THE VARIABLE VANE ARRANGEMENT

Figure 1:
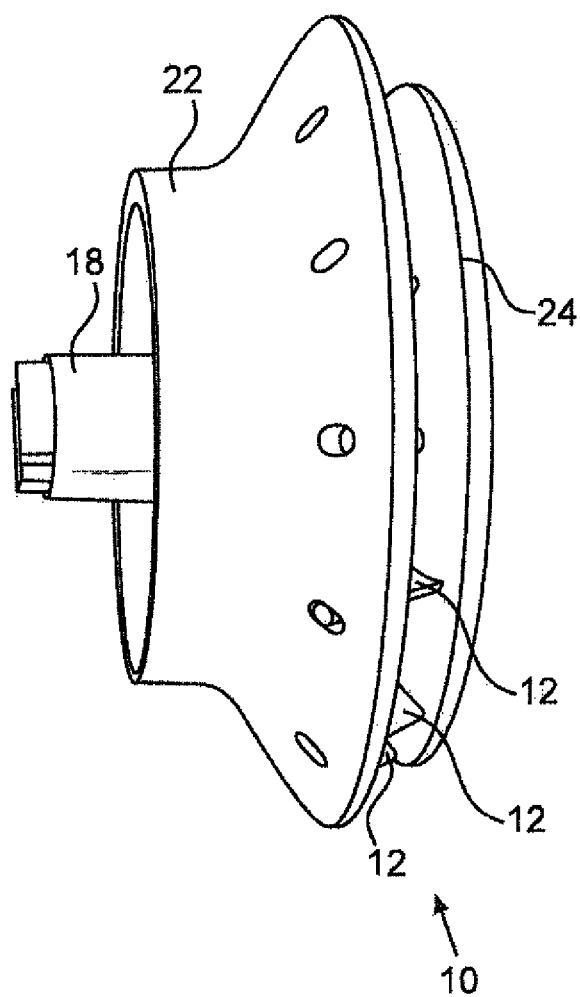
FIG. 1 shows a schematic side view of a variable turbine geometry for a mixed flow turbine of an exhaust gas turbocharger.
Figure 2:
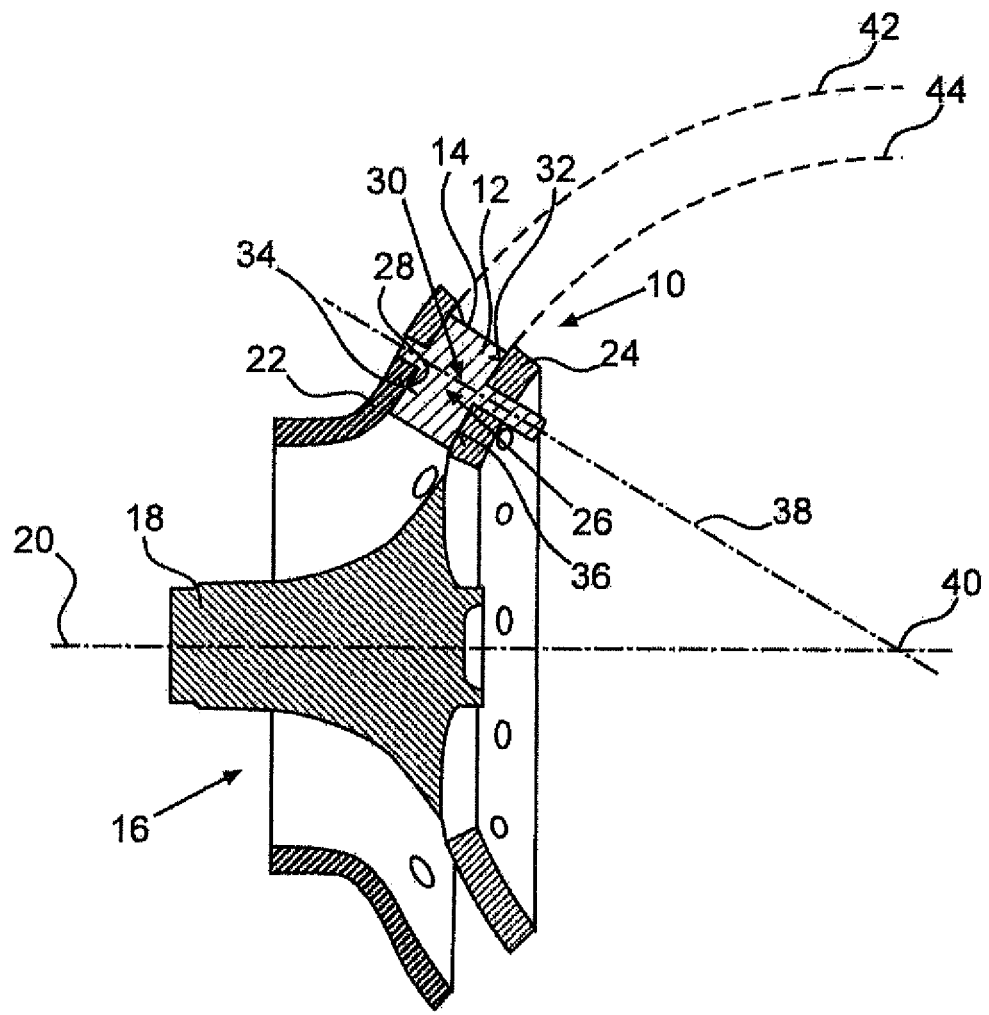
FIG. 2 shows a schematic longitudinal cross sectional view of the variable turbine geometry according to FIG. 1.

FIGS. 1 and 2 illustrate a variable turbine geometry of the fluid energy machine according to the invention which is generally identified by the numeral 10 for a turbine of an exhaust gas turbocharger, which is shown in a cross-sectional view in FIGS. 1 and 2. The configuration of the variable turbine geometry may, however, be readily applied to another fluid energy machine as, e.g. to a compressor of the exhaust gas turbocharger which will then be provided with a variable flow geometry.

The variable turbine geometry 10 comprises a plurality of guide vanes 12 only one of which is illustrated as representative in FIG. 2. The guide vanes 12 are arranged in an inlet flow passage 14 of the turbine, with the inlet flow passage 14 being also referred to as inlet nozzle.

The turbine comprises a turbine casing (not shown in FIGS. 1 and 2) with at least one exhaust branch. Exhaust gas from an internal combustion engine which is associated with the turbine may flow through the exhaust gas supply duct and be directed to the inlet flow passage 14. On the one hand, the inlet flow passage 14 is in fluid communication with the supply duct and on the other hand the inlet flow passage 14 opens into a housing space 16 of the turbine. In the housing space 16, a schematically depicted turbine wheel 18 is accommodated rotatably about an axis of rotation 20 relative to the turbine casing. The turbine wheel 18 is driven by the exhaust gas which flows from the supply duct via the inlet flow passage 14 and past the guide vanes 12 into the housing space 16, so that the turbine wheel rotates about the axis of rotation 20. Thereby, the exhaust gas is deflected by means of the guide vanes 12, so that the exhaust gas may aerodynamically efficiently flow into the turbine wheel 18 and past the rotor wheel blades, of the turbine wheel 18. Thus, the guide vanes 12 will generate an inlet swirl by means of which the turbine wheel 18 is driven efficiently.

The inlet flow passage 14 is delimited on the one hand by means of a first insertion element 22 of the turbine and on the other hand by means of a second insertion element 24 of the turbine. The insertion elements 22, 24 are accommodated in the turbine casing.

The first insertion element 22 forms a first wall area 26 which confines the inlet flow passage 14 at a first side 28. The second insertion element 24 forms a second wall area 30 which confines the supply duct 14 at a second side 32 opposite the first side 28.

Between the wail areas 26 and 28, guide vanes 12 are arranged. Each of the guide vanes 12 comprises a first guide vane area 34 which abuts the first wall area 26 and, each of the guide vanes 12 comprises a second guide vane area 36 which abuts the second wall area 30.

In order to adapt the turbine to different operating points of the combustion engine and thus to different mass flows of the exhaust gas as required, the guide vanes 12 are supported by the insertion elements 22, 24 so as to be rotatable about second axes of rotation 38 relative to the turbine casing as well as relative to the insertion elements 22, 24. By rotating the guide vanes 12 about the respective second axes of rotation 38 the effective flow cross-section of the supply duct 14 may be varied, i.e. fluidly enlarged or, conversely, fluidly constricted. Depending on the actual mass flow of the exhaust gas the turbine wheel 18 may therefore be efficiently driven. The effective flow cross-section of the supply duct 14 may be adapted to the relevant operation only by a well-defined length or height, respectively, of the guide vanes 12. With greater length of the guide vanes 12, a larger overlapping of neighboring guide vanes 12, in particular when the guide vanes 12 are closed, may be achieved or the number of guide vanes 12 may be reduced. This means that by changing the length or height, respectively, of the guide vanes 12 the flow rate may be adapted to the desired operation.

As can be seen from FIG. 2, the guide vanes 12 are supported both on the side of the first insertion element 22 and on the side of the second insertion element 24 and thus on both sides. In an exemplary embodiment which is not shown in detail, the guide vanes 12 are supported on one side in the first insertion element 22. The second insertion element 24 is quasi integrally formed with the turbine casing which is not shown in detail. In other words, the second insertion element 24 is formed by means of the turbine casing. in another exemplary embodiment which is not shown in detail, the guide vanes 12 are supported on one side in the second insertion element 24. The first insertion element 22 is quasi integrally formed with the turbine casing which is not shown in detail. In other words, the first insertion element 22 is formed by the turbine casing.

As may also be seen from FIG. 2, the second axes of rotation 38 extend at an angle relative to the axial direction and at an angle relative to the radial direction of the turbine and intersect the first axis of rotation 20 in a point of intersection 40. Here, the point of intersection 40 is the center of a first pitch circle 42 shown by a broken line as well as of a second pitch circle 44 shown by a broken line. In other words, the pitch circles 42, 44 are arranged concentrically with respect to their center, that is, the point of intersection 40.

The inlet flow passage 14 is formed by the spaced spherical wall sections 22, 24 which have the common center of curvature 40 disposed on the first axis of rotation (20), and the vanes 12 are supported in the flow passage 14 so as to be rotatable about the second axis 38 extending through the common center of curvature 40 and have opposite end areas 34, 36 which are in abutment with the spaced spherical wall sections 22, 24 and which are also curved along a line with a center of curvature 40 so as to be pivotable between the spaced spherical wall sections 22, 24 without, or with only minimal clearance.

This ball-segmented or spherical design arrangement enables an unrestricted rotation free from jamming of the guide vanes 12 and at the same time the realization of very small gap dimensions between the guide vanes 12 and the insertion elements 22, 24. Thereby, the secondary flow losses may be kept small, so that the exhaust gas flow may be directed to the turbine wheel 18 by means of the guide vanes 12 and only a minute amount of the exhaust gas may bypass the guide vanes 12 and flow undirected into the turbine wheel 18.

An actuating device for rotating the guide vanes 12 about the second axis of rotation 38 may be arranged on the turbine side or on the compressor side.

In an exemplary embodiment which is not shown in detail, the first insertion element 22 is connected to the second insertion element 24 by means of spacer elements. This is advantageous in that the variable turbine geometry 10 comprising the plurality of guide vanes 12 may be installed in the turbine casing in the form of a pre-assembled component group. The spacer elements serve to provide a fixed distance between the first insertion element 22 and the second insertion element 24, so that the plurality of guide vanes 12 may be safely rotated in each operating condition. In other words, a uniform distance between the first insertion element 22 and the second insertion element 24 is ensured by means of the spacer elements between the first side 28 and the second side 32 over the entire circumference of the variable turbine geometry 10, at least however in the area between the first guide vane area 34 and the second guide vane area 36.

The first insertion element 22 could also be supported floatingly in the turbine casing, that is, the first insertion element 22 may be movably accommodated in the turbine casing.

What is claimed is:

1. A fluid energy machine for an exhaust gas turbocharger of an auto-mobile including:
a casing which comprising a housing space accommodating a rotor wheel which is accommodated in the housing space and rotates about a first axis of rotation extending in an axial direction of the casing,
spherical insertion elements, disposed in the casing, in a spaced relationship to form therebetween a flow passage through which gas flows at an angle relative to the axial direction and at an angle relative to the radial direction to, or from, the housing space,
  wherein the spherical insertion elements are in the spaced relationship forming the flow passage having a common center of curvature disposed on the first axis of rotation,
a guide vane structure with guide vane elements supported in the flow passage and rotates about a second axis of rotation which extends through the common center of curvature at an angle,
  wherein the guide vane elements have opposite axial end areas which abut the spherical insertion elements and are also curved spherically with a center of curvature coinciding with the common center of curvature of the spherical insertion elements with a minimal clearance therebetween,
  wherein the second axis of rotation of the guide vane elements is slanted relative to the first axis of rotation of the rotor wheel to form an angle of inclination.

2. The fluid energy machine according to claim 1, wherein the flow passage (14) is confined by the spherical insertion elements (22, 24) which are formed separate from the casing and accommodated in the casing.

3. The fluid energy machine according to claim 2, wherein the guide vane elements (12) are rotatably supported by at least one of the spherical insertion elements (22, 24) so as to be pivotable about the second axis of rotation (38).

4. The fluid energy machine according to claim 1, wherein the guide vane element (12) is rotatably supported about the second axis of rotation (38), by a bearing which is formed at least at one side of each guide vane element.

5. An exhaust gas turbocharger for a combustion engine with at least one fluid energy machine according to claim 1.

* * * * *